(12) United States Patent
Park et al.

(10) Patent No.: US 9,247,240 B2
(45) Date of Patent: Jan. 26, 2016

(54) THREE-DIMENSIONAL GLASSES, THREE-DIMENSIONAL IMAGE DISPLAY APPARATUS, AND METHOD FOR DRIVING THE THREE-DIMENSIONAL GLASSES AND THE THREE-DIMENSIONAL IMAGE DISPLAY APPARATUS

(75) Inventors: Jangwoong Park, Seoul (KR); Beomjin Jeon, Seoul (KR); Minsup Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 306 days.

(21) Appl. No.: 13/878,390

(22) PCT Filed: Oct. 10, 2011

(86) PCT No.: PCT/KR2011/007481
§ 371 (c)(1),
(2), (4) Date: Apr. 8, 2013

(87) PCT Pub. No.: WO2012/047073
PCT Pub. Date: Apr. 12, 2012

(65) Prior Publication Data
US 2013/0194400 A1   Aug. 1, 2013

Related U.S. Application Data

(60) Provisional application No. 61/391,090, filed on Oct. 8, 2010, provisional application No. 61/429,733, filed on Jan. 4, 2011.

(51) Int. Cl.
| H04N 13/04 | (2006.01) |
| H04N 9/47 | (2006.01) |
| G02B 27/22 | (2006.01) |

(52) U.S. Cl.
CPC ........ *H04N 13/0438* (2013.01); *G02B 27/2228* (2013.01); *H04N 13/0452* (2013.01); *H04N 13/0497* (2013.01)

(58) Field of Classification Search
CPC .......... H04N 13/0438; H04N 13/0497; H04N 13/0452
USPC .......................................................... 348/53
See application file for complete search history.

(56) References Cited

U.S. PATENT DOCUMENTS

| 5,293,227 A | * | 3/1994 | Prince ............................. 348/53 |
| 5,357,277 A | * | 10/1994 | Nakayoshi et al. ............. 348/55 |

(Continued)

FOREIGN PATENT DOCUMENTS

| GB | 2481094 A | * | 12/2011 |
| KR | 2002-0050897 A | | 6/2002 |

(Continued)

*Primary Examiner* — Sath V Perungavoor
*Assistant Examiner* — Robert S Ho
(74) *Attorney, Agent, or Firm* — Birch, Stewart, Kolasch & Birch, LLP

(57) ABSTRACT

The present invention relates to three-dimensional glasses, to a three-dimensional image display apparatus, and to a method for driving the three-dimensional glasses and the three-dimensional image display apparatus. The present invention is a method for driving three-dimensional glasses for watching a three-dimensional image consisting of a left-eye image and a right-eye image, wherein the method comprises the following steps: transmitting glasses characteristic information, including information relating to the opening/closing speed of shutters of a left-eye lens unit and a right-eye lens unit of the three-dimensional glasses, to an external three-dimensional image display apparatus for outputting the three-dimensional image; receiving synchronization information, including information relating to the output periods of the left-eye image and right-eye image, from the three-dimensional image display apparatus; and synchronizing, using the synchronization information, the opening/closing periods of the shutters of the left-eye lens unit and the right-eye lens unit with the output periods of the left-eye image and right-eye image outputted by the three-dimensional image display apparatus. The synchronization information includes information on the time of opening the shutter of the left-eye lens unit, information on the time of closing the shutter of the left-eye lens unit, and information on modes for indicating the type of image outputted by the three-dimensional image display apparatus, and the method for driving the three-dimensional glasses and three-dimensional image display apparatus of the present invention, efficient data communication between the three-dimensional glasses and the three-dimensional image display apparatus is enabled, in order to increase the convenience of a user watching the three-dimensional images and prevent the unnecessary consumption of a battery of the three-dimensional glasses.

8 Claims, 13 Drawing Sheets

(56) References Cited

U.S. PATENT DOCUMENTS

| | | | |
|---|---|---|---|
| 6,166,729 A * | 12/2000 | Acosta et al. | 715/719 |
| 6,359,661 B1 * | 3/2002 | Nickum | 348/734 |
| 6,400,272 B1 * | 6/2002 | Holtzman et al. | 340/572.1 |
| 8,890,772 B2 * | 11/2014 | Woo et al. | 345/6 |
| 2001/0043266 A1 * | 11/2001 | Robinson et al. | 348/53 |
| 2006/0290778 A1 * | 12/2006 | Kitaura et al. | 348/51 |
| 2007/0035830 A1 * | 2/2007 | Matveev et al. | 359/464 |
| 2009/0109282 A1 * | 4/2009 | Schnebly et al. | 348/55 |
| 2010/0066820 A1 * | 3/2010 | Park et al. | 348/53 |
| 2010/0085424 A1 * | 4/2010 | Kane et al. | 348/53 |
| 2010/0149320 A1 * | 6/2010 | MacNaughton et al. | 348/51 |
| 2010/0157425 A1 * | 6/2010 | Oh | 359/464 |
| 2010/0177168 A1 * | 7/2010 | Hu | 348/47 |
| 2010/0194857 A1 * | 8/2010 | Mentz et al. | 348/43 |
| 2010/0259603 A1 * | 10/2010 | Mihara et al. | 348/53 |
| 2010/0309535 A1 * | 12/2010 | Landowski et al. | 359/107 |
| 2011/0025821 A1 * | 2/2011 | Curtis et al. | 348/43 |
| 2011/0050849 A1 * | 3/2011 | Lee et al. | 348/43 |
| 2011/0074937 A1 * | 3/2011 | Nakahata | 348/56 |
| 2011/0102557 A1 * | 5/2011 | So et al. | 348/51 |
| 2011/0102558 A1 * | 5/2011 | Moliton et al. | 348/54 |
| 2011/0199460 A1 * | 8/2011 | Gallagher | 348/46 |
| 2011/0216175 A1 * | 9/2011 | Shimoyama et al. | 348/56 |
| 2011/0234586 A1 * | 9/2011 | Aoki | 345/419 |
| 2011/0234774 A1 * | 9/2011 | Satoh et al. | 348/56 |
| 2011/0248859 A1 * | 10/2011 | Park et al. | 340/636.1 |
| 2011/0254933 A1 * | 10/2011 | Seo et al. | 348/56 |
| 2011/0292191 A1 * | 12/2011 | Macnaughton et al. | 348/56 |
| 2012/0050468 A1 * | 3/2012 | Takahashi et al. | 348/43 |
| 2012/0098749 A1 * | 4/2012 | Liu et al. | 345/169 |
| 2012/0268577 A1 * | 10/2012 | Oura | 348/56 |
| 2013/0002654 A1 * | 1/2013 | Yeh et al. | 345/419 |
| 2013/0002836 A1 * | 1/2013 | Seo et al. | 348/56 |
| 2013/0076878 A1 * | 3/2013 | Nakajima | 348/56 |
| 2013/0155210 A1 * | 6/2013 | Ma | 348/56 |
| 2013/0286163 A1 * | 10/2013 | Dror et al. | 348/47 |
| 2015/0077530 A1 * | 3/2015 | Jang | 348/56 |

FOREIGN PATENT DOCUMENTS

| | | |
|---|---|---|
| KR | 10-2008-0091327 A | 10/2008 |
| KR | 10-2010-0052991 A | 5/2010 |
| WO | WO 2010151028 A2 * | 12/2010 |

* cited by examiner

FIG. 4

[ Format of Goggle Characteristic Index Frame]

| Octects : 2 | Octects : 2 | 2 |
|---|---|---|
| MHR | Shutter Response time | MFR |

FIG. 5

| MHR | BITS : 1 | 2 | Octects: 2 | 3 | Octects: 2 | 2 | 2 | 2 | 2 | variable |
|---|---|---|---|---|---|---|---|---|---|---|
| | Parameter change | Operating Mode | Synch Period | Image Sequence | RO Count | CAR Count | LO count | cal Count | Time stamp | Reserved MFR |

[ Format of Sync Frame ]

FIG. 6

[Right Open Count]

| Value | Description |
|---|---|
| 0x0000~ 0xffff | 1 us ~ 65 ms (resolution is 1 us) |

[Close After Right Count]

| Value | Description |
|---|---|
| 0x0000~ 0xffff | 1 us ~ 65 ms (resolution is 1 us) |

[Left Open Count]

| Value | Description |
|---|---|
| 0x0000~ 0xffff | 1 us ~ 65 ms (resolution is 1 us) |

[Close After Left Count]

| Value | Description |
|---|---|
| 0x0000~ 0xffff | 1 us ~ 65 ms (resolution is 1 us) |

FIG. 7

[Operating Mode]

| value | Description |
|-------|-------------|
| 00 | 2D |
| 01 | 3D |
| 10 | Dual Mode |
| 11 | reserved |

FIG. 8

[Image Sequence]

| value | Description |
|---|---|
| 000 | C-L-C-R |
| 001 | C-R-C-L |
| 010 | L-C-R-C |
| 011 | R-C-L-C |
| 100~111 | reserved |

FIG. 9

[Parameter Change]

| Value | Description |
|---|---|
| 0 | Any information on TV is NOT Changed |
| 1 | Some information on TV is Changed |

FIG. 10

| Octects : 2 | 1 | 0/2 | 0/2/8 | 0/2 | 0/2/8 |
|---|---|---|---|---|---|
| Frame control | Sequence number | Destination PAN identifier | Destination address | Source PAN identifier | Source address |
| | | Addressing fields | | | |
| MHR | | | | | |

FIG. 11

| MHR | Octects : 1 | MFR |
|---|---|---|
|  | State Info. Index |  |

[State Info. Index]

| Value | Description | Value | Description |
|---|---|---|---|
| x000 xxxx | Sync Success | xxxx 0011 | Battery Level indication (25%) |
| x010 xxxx | Sync Fail | xxxx 0100 | Battery Level indication (0%) |
| x010 xxxx | Goggle off | xxxx 1000 | Battery Level indication (100%) |
| 1xxx xxxx | Identification Request | xxxx 0011 | Battery Level indication (75%) |
| xxxx 0000 | Battery Level indication (50%) | xxxx 1001 | Battery Level indication (50%) |
| xxxx 0001 | Battery Level indication (50%) | xxxx 0011 | Battery Level indication (25%) |
| xxxx 0010 | Battery Level indication (50%) | xxxx 1010 | Battery Level indication (0%) |

THREE-DIMENSIONAL GLASSES, THREE-DIMENSIONAL IMAGE DISPLAY APPARATUS, AND METHOD FOR DRIVING THE THREE-DIMENSIONAL GLASSES AND THE THREE-DIMENSIONAL IMAGE DISPLAY APPARATUS

CROSS REFERENCE TO RELATED APPLICATIONS

This non-provisional application is a National Stage entry under U.S.C. §371 of International Application No. PCT/KR2011/007481 filed on Oct. 10, 2011, which claims the benefit of U.S. Provisional Application Nos. 61/391,090 filed on Oct. 8, 2010 and 61/429,733 filed on Jan. 4, 2011. The entire contents of all of the above applications are hereby incorporated by reference.

TECHNICAL FIELD

The present invention relates to a 3 dimensional glasses, a 3 dimensional image display apparatus, and a method of operating the 3 dimensional glasses and the 3 dimensional image display apparatus, and more particularly, to the 3 dimensional glasses, the 3 dimensional image display apparatus, and the method of operating the 3 dimensional glasses and the 3 dimensional image display apparatus to watch a 3 dimensional image alternately represented by a left-eye image and a right-eye image.

BACKGROUND ART 3 dimensional image technology can be applied to such a various field as information and communication, broadcasting, medical care, education, training, military, game, animation, virtual reality, CAD, industrial technology, and the like. Thus, the 3 dimensional image technologies can be called a core technology of a next generation 3 dimensional multimedia information and communication commonly required by the various fields.

In general, a 3 dimensional effect recognized by a human occurs by a combination of an extent of change of crystalline lens according to a position of an object intended to be observed, an angle difference between both eyes and a target, difference of a position and a form for a target seen by the both eyes, binocular disparity occurred by a movement of a target, other effects caused by various psychology and memories, and the like.

Among the aforementioned factors, the binocular disparity occurring due to a space between two eyes horizontally apart from each other about 6~7 cm may be one of a most important factor for a 3 dimensional effect.

In particular, an object can be seen with an angle difference because of the binocular disparity and images coming to each of eyes have reflections different from each other because of the binocular disparity. When these two images are delivered to a brain via retinas, the brain at last feels the original 3 dimensional image in a manner of precisely combining the two informations.

3 dimensional image display apparatus is classified into a glasses type using a special glasses and a non-glasses type not using the special glasses. The glasses type includes a color filter technique, which separates and selects an image using a color filter having a relation of complementary color with each other, a polarizing filter technique, which separates images of a left eye and a right eye using a shading effect by a combination of an orthogonal polarizing element, and a shutter glasses technique, which enables to feel a 3 dimensional effect by alternatively blocking a left eye and a right eye in response to a synchronization signal projecting a left eye image signal and a right eye image signal to a screen.

Meanwhile, a user should wear 3 dimensional glasses to watch a 3 dimensional image using the glasses type. Yet, since the user does not watch 3 dimensional images all the time, the 3 dimensional glasses should operate only when 3 dimensional images are outputted in a 3 dimensional display apparatus.

Yet, according to a conventional 3 dimensional glasses, there exists inconvenience of switching on/off of the 3 dimensional glasses for a user to operate the 3 dimensional glasses. Moreover, there exists inconvenience of fast discharging of a battery of the 3 dimensional glasses due to an operation of the 3 dimensional glasses even in a situation of not watching 3 dimensional images.

Thus, searching for a method of operating 3 dimensional glasses enabling for a user to more efficiently watch a 3 dimensional image is requested.

DISCLOSURE OF THE INVENTION

Technical Task

The present invention is intended to solve the aforementioned problem. An object of the present invention is to provide a 3 dimensional glasses, a 3 dimensional image display apparatus, and a method of operating the 3 dimensional glasses, the 3 dimensional image display apparatus configured to watch a 3 dimensional image by a user more efficiently.

Technical Solution

According to the present invention, a method of operating a 3 dimensional glasses to watch a 3 dimensional image consisted of a left eye image and a right eye image includes the steps of transmitting a goggle characteristic information including an opening and closing speed information of a shutter mounted on a left eye lens unit and a right eye lens unit of the 3 dimensional glasses to an external 3 dimensional image display apparatus displaying the 3 dimensional image and receiving a sync information including an output period information of the left eye image and the right eye image from the 3 dimensional image display apparatus; and synchronizing an opening and closing period of the shutter mounted on the left eye lens unit and the right eye lens unit with the output period of the left eye image and the right eye image outputted in the 3 dimensional image display apparatus using the sync information. The sync information includes a shutter opening time information of the left eye lens unit, a shutter closing time information of the left eye lens unit, and a mode information indicating a kind of image outputted in the 3 dimensional image display apparatus.

In particular, according to embodiment of the present invention, the sync information includes a change identification information indicating whether the sync information is identical to a previously transmitted sync information.

In particular, according to embodiment of the present invention, the sync information includes an output sequence of the left eye image and the right eye image outputted in the 3 dimensional image display apparatus.

In particular, according to embodiment of the present invention, the sync information includes an identification information of the 3 dimensional glasses to which the sync information is transmitted.

In particular, according to embodiment of the present invention, the sync information includes a transmission cycle information of the sync information of the 3 dimensional image display apparatus.

In particular, according to embodiment of the present invention, the method further includes the step of transmitting a goggle state information of the 3 dimensional glasses to the 3 dimensional image display apparatus. The goggle state information includes an information indicating an identification request of the 3 dimensional glasses.

And, according to the present invention, a 3 dimensional glasses to watch a 3 dimensional image consisted of a left eye image and a right eye image includes a left eye lens unit configured to watch the left eye image and a right eye lens unit configured to watch the right eye image, a goggle communication unit configured to communicate a data with an external 3 dimensional image display apparatus displaying the 3 dimensional image, and a goggle control unit controlling the goggle communication unit to transmit a goggle characteristic information including an opening and closing speed information of a shutter mounted on a left eye lens unit and a right eye lens unit to the 3 dimensional image display apparatus, the goggle control unit controlling the goggle communication unit to receive a sync information including an output period information of the left eye image and the right eye image from the 3 dimensional image display apparatus, the goggle control unit synchronizing an opening and closing period of the shutter mounted on the left eye lens unit and the right eye lens unit with the output period of the left eye image and the right eye image outputted in the 3 dimensional image display apparatus using the sync information. The sync information includes a shutter opening time information of the left eye lens unit, a shutter closing time information of the left eye lens unit, and a mode information indicating a kind of image outputted in the 3 dimensional image display apparatus.

And, according to the present invention, a method of operating a 3 dimensional image display apparatus displaying a 3 dimensional image consisted of a left eye image and a right eye image includes the steps of receiving a goggle characteristic information including an opening and closing speed information of a shutter mounted on a left eye lens unit and a right eye lens unit of the 3 dimensional glasses from an external 3 dimensional glasses to watch the 3 dimensional image and transmitting a sync information including an output period information of the left eye image and the right eye image to the 3 dimensional glasses. The sync information comprises a shutter opening time information of the left eye lens unit, a shutter closing time information of the left eye lens unit, and a mode information indicating a kind of image outputted in the 3 dimensional image display apparatus.

And, according to the present invention, a 3 dimensional image display apparatus displaying a 3 dimensional image consisted of a left eye image and a right eye image includes a display unit configured to output the 3 dimensional image to a user, a communication unit configured to communicate data with an external 3 dimensional glasses to watch the 3 dimensional image, and a control unit controlling the communication unit to receive a goggle characteristic information including an opening and closing speed information of a shutter mounted on a left eye lens unit and a right eye lens unit of the 3 dimensional glasses from the 3 dimensional glasses, the control unit controlling the communication unit to transmit a sync information including an output period information of the left eye image and the right eye image to the 3 dimensional glasses. The sync information comprises a shutter opening time information of the left eye lens unit, a shutter closing time information of the left eye lens unit, and a mode information indicating a kind of image outputted in the 3 dimensional image display apparatus.

The present invention may be non-limited to the aforementioned embodiments. As shown in the attached scope of claim, various modifications and variations can be made by those having ordinary knowledge in the field, to which the present invention pertains and the modifications belong to the scope of the present invention.

Advantageous Effects

Accordingly, 3 dimensional glasses, a 3 dimensional image display apparatus, and a method of operating the 3 dimensional glasses/image display apparatus enable to efficiently communicate data between the 3 dimensional glasses and the 3 dimensional image display apparatus, thereby increasing convenience of a user watching a 3 dimensional image and preventing the 3 dimensional glasses from unnecessary battery consumption.

DESCRIPTION OF DRAWINGS

FIG. 4 is a diagram for a format of goggle characteristic index frame according to embodiment of the present invention;

FIG. 5 is a diagram for a format of sync frame according to a $1^{st}$ embodiment of the present invention;

FIG. 6 is a diagram for formats of right open count, close after right count, left open count, close after left count field according to a $1^{st}$ embodiment of the present invention;

FIG. 7 is a diagram for a format of an operating mode field according to a $1^{st}$ embodiment of the present invention;

FIG. 8 is a diagram for a format of an image sequence field according to a $1^{st}$ embodiment of the present invention;

FIG. 9 is a diagram for a format of a parameter change field according to a $1^{st}$ embodiment of the present invention;

FIG. 10 is a diagram for a format of a frame control according to a $1^{st}$ embodiment of the present invention;

FIG. 11 is a diagram for a format of a goggle state frame according to a $1^{st}$ embodiment of the present invention;

BEST MODE

Embodiments of the present invention are explained in detail with reference to the accompanying drawings to enable for those skilled in the art that the present invention pertains to implement. For clarity, the same name and same reference number will be used for the same configuration element in the following description.

Although terminologies used in the present invention are selected from general terminologies used currently and widely. Occasionally, some terminologies may be arbitrarily selected by the applicant(s). In this case, the meanings of the arbitrarily selected terminologies shall be described in the corresponding part of the detailed description of the invention. Therefore, terminologies used in the present invention need to be construed based on the substantial meanings of the corresponding terminologies and the overall matters disclosed in the present invention rather than construed as simple names of the terminologies.

Figure 1:
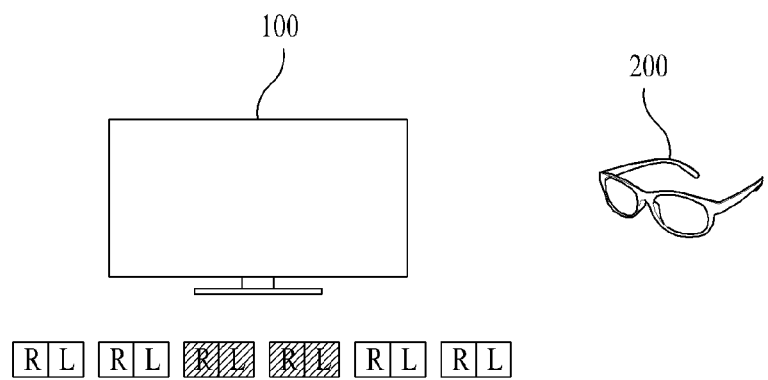
FIG. 1 is a diagram of a 3 dimensional image providing system including a 3 dimensional glasses and a 3 dimensional image display apparatus according to embodiment of the present invention.

FIG. 1 is a diagram of a 3 dimensional image providing system 1 including 3 dimensional glasses 200 and a 3 dimensional image display apparatus 100 according to embodiment of the present invention.

Referring to FIG. 1, a 3 dimensional image providing system 1 includes a 3 dimensional image display apparatus 100 displaying an image by processing an image signal inputted from outside and 3 dimensional glasses 200 selectively penetrating a light if the image displayed in the 3 dimensional image display apparatus 100 corresponds to a 3 dimensional image. In particular, the 3 dimensional glasses 200 of the present invention can be implemented as 3 dimensional glasses 200 configured to selectively operate to penetrate or block a light.

The 3 dimensional image display apparatus 100 receives an image signal from an external image source, which is not depicted. The image source may be non-limited. The 3 dimensional image display apparatus 100 may be able to receive the image signal from such a various image source as a main computer generating an image signal with CPU (not depicted) and a graphic card (not depicted) and then providing the image signal to a local, a server (not depicted) providing the image signal to a network, a transmission device (not depicted) of a broadcasting station transmitting a broadcasting signal using a public TV or a cable, an image signal recorded DVD, a Blu-ray, and the like.

As a 2 dimensional image signal or a 3 dimensional image signal is received, the 3 dimensional image display apparatus 100 processes the signal and then displays it as an image. In this case, unlike a 2 dimensional image, a 3 dimensional image includes a left eye image corresponding to a left eye of a user and a right eye image corresponding to a right eye of the user. In case that the 3 dimensional image signal is received, the 3 dimensional image display apparatus 100 according to the present embodiment alternately displays the left eye image and the right eye image by a frame unit based on the 3 dimensional image signal.

In case that the 3 dimensional image is displayed in the 3 dimensional image display apparatus 100, the 3 dimensional glasses 200 selectively opens or blocks a sight for the left eye or the right eye of the user in accordance with whether a currently displayed image is the left eye image or the right eye image.

In particular, in case that the left eye image is displayed in the 3 dimensional image display apparatus 100, the 3 dimensional glasses 200 opens the sight of the left eye and blocks the sight of the right eye. On the contrary, in case that the right eye image is displayed in the 3 dimensional image display apparatus 100, the 3 dimensional glasses 200 opens the sight of the right eye and blocks the sight of the left eye.

In the following description, each configuration of the 3 dimensional image display apparatus 100 and the 3 dimensional glasses 200 is explained in detail with reference to FIG. 2.

Figure 2:
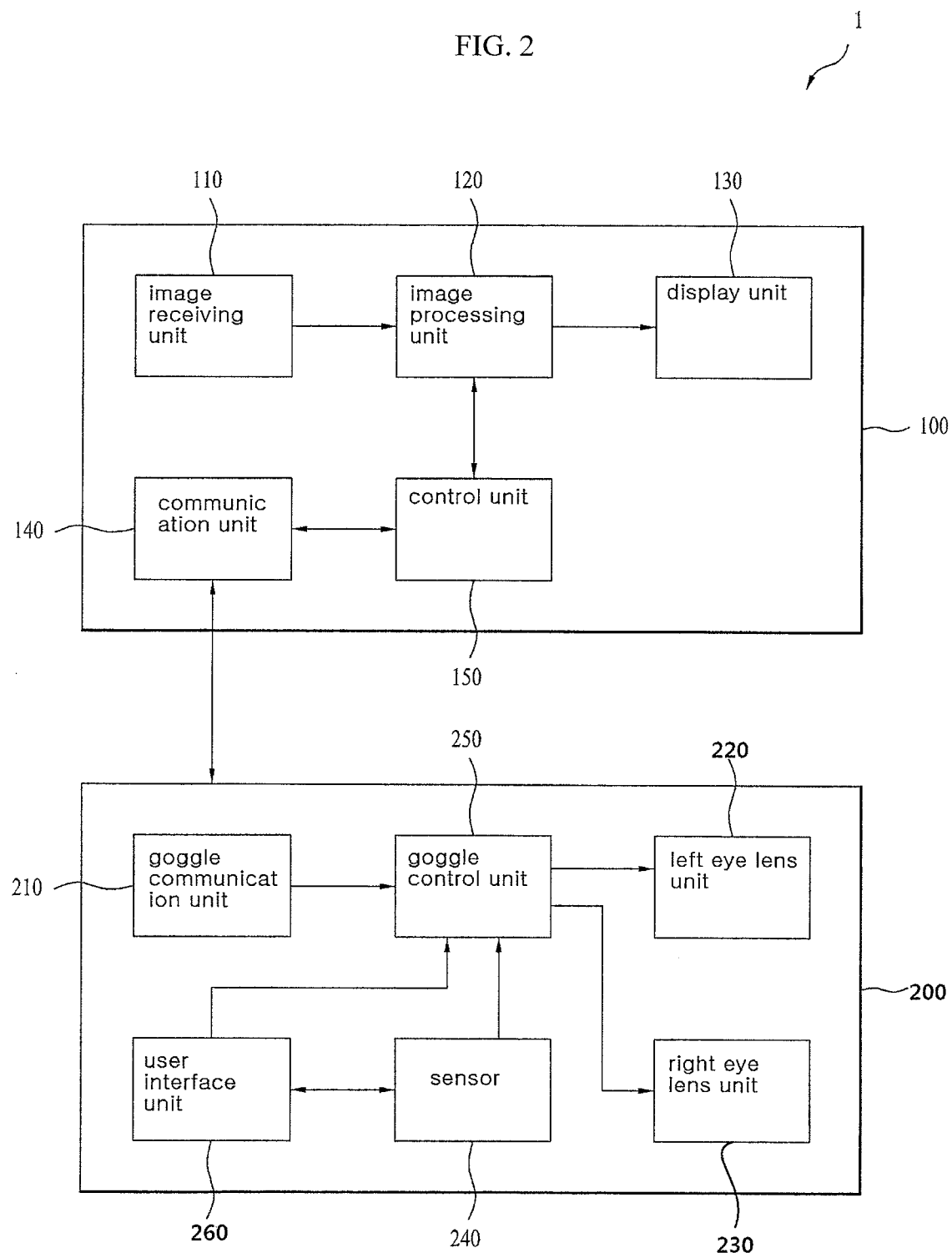
FIG. 2 is a diagram of a structure of a 3 dimensional glasses and a 3 dimensional image display apparatus according to embodiment of the present invention.

FIG. 2 is a diagram of a structure of 3 dimensional glasses 200 and a 3 dimensional image display apparatus 100 according to embodiment of the present invention.

Referring to FIG. 2, the 3 dimensional image display apparatus 100 includes an image receiving unit 110 configured to receive an image signal, an image processing unit 120 configured to process the image signal received by the image receiving unit 110, a display unit 130 configured to display the image signal processed by the image processing unit 120 as an image, a communication unit 140 configured to communicate with the 3 dimensional glasses 200 to transmit a goggle control signal to the 3 dimensional glasses 200 in case that a 3 dimensional image is displayed in the display unit 130, and a control unit 150 configured to control an operation of the configuration.

And, the 3 dimensional glasses 200 includes a goggle communication unit 210 configured to receive a goggle control signal in a manner of communicating with the communication unit 140, a lens unit 220/230 configured to respectively open/close a left eye and a right eye of a user, a sensor 240 configured to sense a state of the 3 dimensional glasses 200, a user interface unit 260 configured to receive an input of operation command from a user, and a goggle control unit 250 configured to control each configuration of the 3 dimensional glasses 200 and selectively open/close the lens unit 220/230 based on a goggle control signal. In this case, the lens unit 220/230 includes a left eye lens unit 220 corresponding to a left eye of a user and a right eye lens unit 230 corresponding to a right eye of the user.

In the following description, each configuration element of the 3 dimensional image display apparatus 100 is explained in detail.

The image receiving unit 110 receives an image signal and delivers the image signal to the image processing unit 120. The image receiving unit can be implemented in a various way according to a standard of a received image signal and an implementation form of a display apparatus 100.

For instance, in case that the 3 dimensional image display apparatus 100 is implemented as TV, the image receiving unit 110 receives an RF (radio frequency) signal transmitted from a broadcasting station (not depicted) in wireless or may be able to receive a composite video, a component video, a super video, an image signal by such a standard as SCART, HDMI (high definition multimedia interface), and the like in wired. In case that an image signal corresponds to a broadcasting signal, the image receiving unit 110 include a tuner, which tunes in the broadcasting signal according to a channel.

In case that the 3 dimensional image display apparatus 100 corresponds to a computer monitor, the image receiving unit 110 can be implemented by D-SUB capable of delivering RGB signal according to VGA scheme, DVI-D (digital), DVI-I (integrated digital/analog), DVI-D (digital) according to DVI (digital video interactive) standard, HDMI standard, or the like. Or, the image receiving unit 110 can be implemented by a display port, UDI (unified display interface), wireless HD, or the like.

The present specification explains an example that the 3 dimensional image display apparatus 100 is implemented as a TV in the following description.

The image processing unit 120 performs various pre-set image processing processes for an image signal. The image processing unit 120 outputs the image signal in the display unit 130 in a manner of performing the processes and makes an image to be displayed in the display unit 130.

The kind of image processing process performed by the image processing unit 120 may be non-limited. For instance, the image processing process may include decoding, encoding, de-interlacing, frame refresh rate converting, scaling, noise reduction to enhance image quality, detail enhancement, line scanning, and the like according to various image formats. The image processing unit 120 can be implemented as an individual configuration capable of performing each process independently or can be implemented as an integrated configuration, which integrated many functions.

The image processing unit 120 processes an image signal with a plurality of horizontal scan lines per each frame and scans the image signal in the display unit 130. The image processing unit 120 scans an image from a top to the bottom side of a displaying area of the display unit 130. If a scan for one frame is completed, the image processing unit scans an image of a next frame after a pre-set non-scan period.

In case that an image signal corresponding to a 3 dimensional image is delivered from the image receiving unit 110, the image processing unit 120 alternately scans the image signal corresponding to a left eye image and a right eye image to the display unit 130. Thus, the left eye image and the right eye image are alternately displayed in the display unit 130 for the non-scan period.

Although the implementation method for the display unit 130 may be non-limited, for instance, the display unit is implemented by a liquid crystal display panel and the image signal processed by the image processing unit 120 is displayed in the display unit as an image. The display unit 130 may be able to display an image frame by vertically arranging a plurality of the horizontal scan lines scanned by the image processing unit 120.

The communication unit 140 transmits a goggle control signal including an indication timing information of a 3 dimensional image displayed in the display unit 130 and the like to the 3 dimensional glasses 200 on a pre-set timing according to a control of the control unit 150. In case of transmitting the goggle control signal, the communication unit 140 may be able to apply such a various scheme as an infrared scheme, an RF scheme, a Zigbee scheme, or the like. The present specification explains the Zigbee scheme as an example.

Besides the goggle control signal, the communication unit 140 receives data transmitted from the 3 dimensional glasses 200 and may be then able to deliver the data to the control unit 150. In particular, the communication unit 140 is configured to enable a bidirectional communication between the 3 dimensional image display apparatus 100 and the 3 dimensional glasses 200. And, the data transmitted from the 3 dimensional glasses 200 may include a function information provided by the 3 dimensional glasses 200, a state information of the 3 dimensional glasses 200, and the like.

According to the present embodiment, the bidirectional communication is performed between the communication unit 140 and the 3 dimensional glasses, by which is non-limited to the present invention. A configuration for transmitting a goggle control signal to the 3 dimensional glasses 200 and a configuration for receiving information on the 3 dimensional glasses 200 from the 3 dimensional glasses 200 can be individually configured.

In case that an image displayed in the display unit 130 corresponds to a 3 dimensional image, the control unit 150 transmits a goggle control signal corresponding to the 3 dimensional image to the 3 dimensional glasses 200 and then makes the 3 dimensional glasses 200 operate in response to the 3 dimensional image displayed in the display unit 130. In this case, a configuration of a signal generating unit (not depicted) generating the goggle control signal in response to the 3 dimensional image can be additionally added to the 3 dimensional image display apparatus 100.

The goggle control signal according to the present embodiment may include an information to judge whether an image currently displayed in the display unit 130 corresponds to a 3 dimensional image or a 2 dimensional image, scanning time for a left eye image and a right eye image, which are scanned to the display unit 130, i.e., scan timing information, and the like. Detailed embodiment for the goggle control signal shall be discussed later.

In the following description, each configuring element of the 3 dimensional glasses 200 is explained in detail.

The goggle communication unit 210 is configured according to a communication standard of the communication unit 140. The goggle communication unit receives a goggle control signal transmitted from the communication unit 140 and delivers the goggle control signal to the goggle control unit 250. From this, the goggle control unit 250 may be able to selectively open/close a left eye lens unit 220 and a right eye lens unit 230 based on the goggle control signal transmitted from the display apparatus 100.

The goggle communication unit 250 transmits function information, state information of the 3 dimensional glasses 200, and the like to the communication unit 140 by a control of the goggle control unit 250. According to the present embodiment, although it is described that the goggle communication unit 250 is able to perform a bidirectional communication with the communication unit 140, the present invention may be non-limited to the present embodiment. A configuration for receiving a goggle control signal from the communication unit 140 and a configuration for transmitting information on function, state, and the like can be individually configured.

The left eye lens unit 220 and the right eye lens unit 230 selectively operate in a manner of penetrating a light or blocking a light according to a control of the goggle control unit 250. As mentioned in the above, by selectively performing a light penetration for a left eye and a right eye of a user by the left eye lens unit 220 and the right eye lens unit 230, the user may be able to recognize a left eye image and a right eye image displayed in the display unit 130 via the left eye and the right eye, respectively.

A method of implementing the left eye lens unit 220 and the right eye lens unit 230 may be non-limited. Yet, the method can be implemented by a liquid crystal lens blocking a light penetration in case that voltage is provided and permitting the light penetration in case that the voltage is not provided. Yet, this is exemplary only. The left eye lens unit 220 and the right eye lens unit 230 can also be configured to permit the light penetration in case that the voltage is provided and block the light penetration in case that the voltage is not provided.

The sensor 240 senses a state of the 3 dimensional glasses 200 including a lean angle of the 3 dimensional glasses 200 and the like. The sensor 240 senses the state of the 3 dimensional glasses 200 and then delivers the state of the 3 dimensional glasses to the goggle control unit 250. Example of implementing the sensor may be non-limited. For instance, the sensor can be implemented by such a various method as a tilt sensor, a gyro sensor, or the like.

The goggle control unit 250 selectively provides voltage to the left eye lens unit 220 and the right eye lens unit 230 respectively based on the goggle control signal received by the goggle communication unit 250.

Specifically, in case of scanning an image in the display unit 130, the goggle control unit 250 blocks a light penetration of the left eye lens unit 220 and the right eye lens unit 230. Meanwhile, if an image displayed in the display unit 130 in a non-scan period corresponds to a left eye image, the goggle control unit 250 opens the left eye lens unit 220 and blocks the right eye lens unit 230. If the image corresponds to a right eye image, the goggle control unit 250 blocks the left eye lens unit 220 and opens the right eye lens unit 230. By doing this, a user may be able to recognize the left eye image and the right eye image by the left eye and the right eye, respectively.

Figure 3:
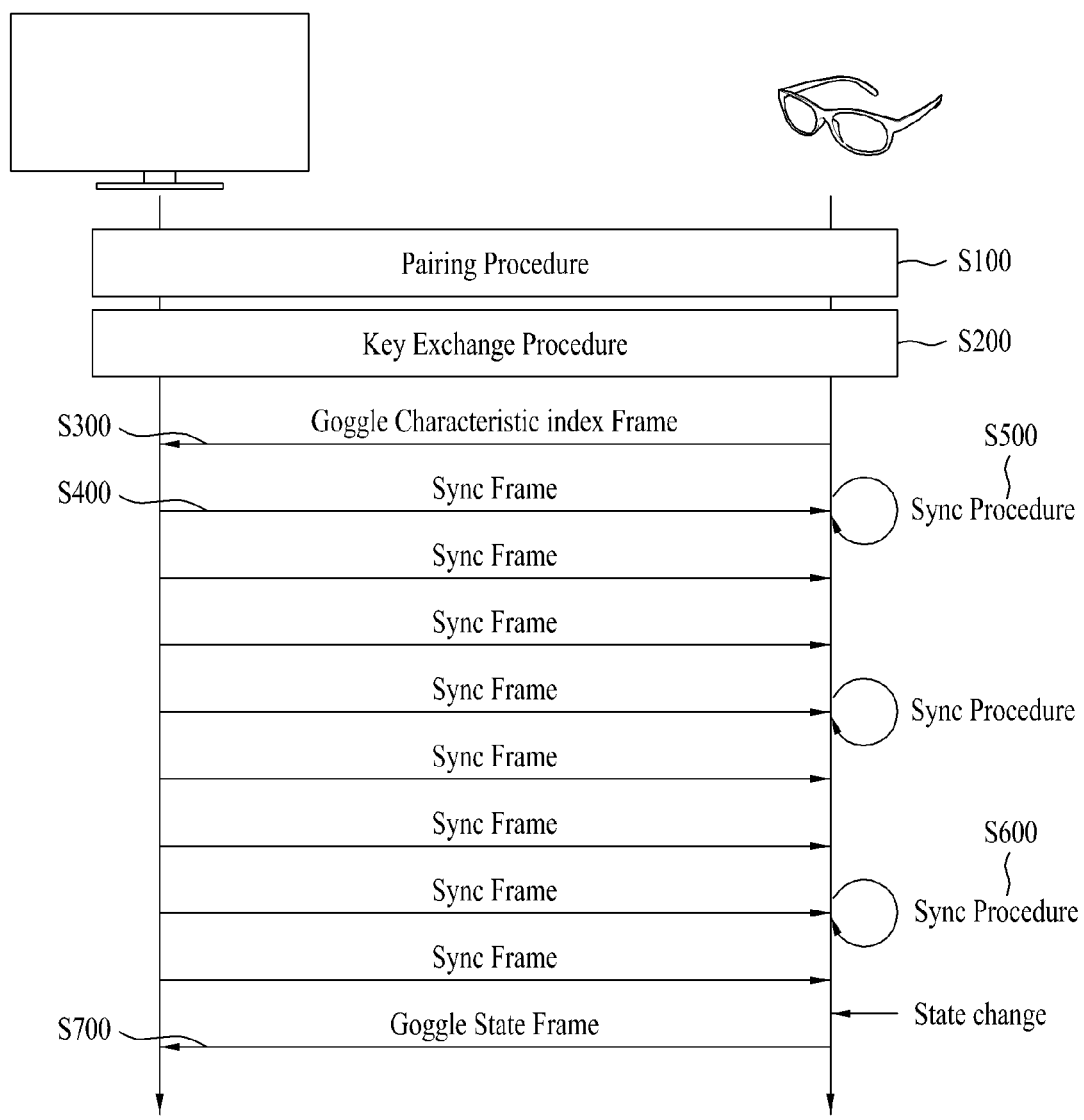
FIG. 3 is an operation flowchart of a 3 dimensional glasses and a 3 dimensional image display apparatus according to embodiment of the present invention.

FIG. 3 is an operation flowchart of a 3 dimensional glasses and a 3 dimensional image display apparatus according to embodiment of the present invention.

As shown in FIG. 3, the operation flow of the 3 dimensional image display apparatus 100 and the 3 dimensional glasses 200 includes a pairing procedure [S100], a key exchange procedure [S200], a goggle characteristic information transmission step [S300], a sync information transmission step [S400], a sync procedure [S500], a goggle state change event occurrence [S600], and a goggle state information transmission step [S700]. In the following description, each step is explained in detail.

First of all, in order to operate the 3 dimensional image display apparatus 100 and the 3 dimensional glasses 200, the pairing procedure [S100] is performed to make the 3 dimensional image display apparatus 100 and the 3 dimensional glasses 200 connected to each other recognize with each other. One example of the pairing procedure [S100] may be able to exchange with each other such a unique information of each device as an identification information of the 3 dimensional image display apparatus 100 and the 3 dimensional glasses 200, a product information, a serial information, and the like.

And, the 3 dimensional glasses 200 transmits a key function information supported by the 3 dimensional glasses 200 to the 3 dimensional image display apparatus 100. One example of the key exchange procedure [S200] is to transmit the function information of keys to the 3 dimensional image display apparatus 100 by the 3 dimensional glasses 200 if the 3 dimensional glasses 200 is equipped with the keys performing such a function as a volume up/down and power on/off.

And, the goggle characteristic information of the 3 dimensional glasses 200 is transmitted to the 3 dimensional image display apparatus 100 [S300]. The goggle characteristic information of the 3 dimensional glasses 200 may include a kind of 3 dimensional glasses 200, shutter speed, and the like. The goggle characteristic information of the 3 dimensional glasses 200 shall be discussed in the following FIG. 4 in detail.

And, the 3 dimensional image display apparatus 100 transmits a sync information to the 3 dimensional glasses 200 [S400]. The sync information of the present invention corresponds to one example of the aforementioned goggle control signal and may include scan timing information of a 3 dimensional image and the like.

As mentioned in the foregoing description, in case that a left eye image is displayed in the 3 dimensional image display apparatus 100, the 3 dimensional glasses 200 opens the left eye lens unit 220 and blocks the right eye lens unit 230. On the contrary, in case that a right eye image is displayed in the 3 dimensional image display apparatus 100, the 3 dimensional glasses 200 opens the right eye lens unit 230 and blocks the left eye lens unit 220. In particular, since the left image and the right image are displayed in the display unit 130 with constant scan timing, the 3 dimensional glasses 200 should be aware of the scan timing of the 3 dimensional image.

According to the present specification, the goggle control signal, which is information for controlling the 3 dimensional glasses 200 such as the scan timing of the 3 dimensional image, is named a sync information. The sync information shall be discussed in detail in the following FIG. 5 to FIG. 9.

And, the 3 dimensional glasses 200 controls an operation of the 3 dimensional glasses 200 using the received sync information [S500]. As one example, the 3 dimensional glasses controls open/close of the shutters of the left eye lens unit 220 and the right eye lens unit 230 according to the scan timing of the 3 dimensional image included in the sync information.

In case that a state change event of the 3 dimensional glasses 200 occurs [S600], the 3 dimensional glasses 200 transmits the goggle state information, which is information on the corresponding event, to the 3 dimensional image display apparatus 100 [S700]. As one example, in case that a state change event occurs, i.e., if a battery level of the 3 dimensional glasses 200 is going down below a certain level, the 3 dimensional glasses 200 transmits the goggle state information including the corresponding battery information to the 3 dimensional image display apparatus 100. The goggle state information shall be discussed in detail in the following FIG. 11.

FIG. 4 is a diagram for a format of goggle characteristic index frame according to embodiment of the present invention.

The goggle characteristic index frame depicted in FIG. 4 is a data structure of the aforementioned goggle characteristic information. As shown in the diagram, the goggle characteristic index frame includes an MHR, a Shutter Response time, an MFR field.

First of all, communication informations determined by Zigbee scheme are recorded in the MHR field and the MFR field.

And, information on shutter opening/closing speed of the 3 dimensional glasses 200 is recorded in the Shutter Response time field. Specifically, time taken for physically opening or closing the shutter of the left eye lens unit 220 and the right eye lens unit 230 is recorded in the Shutter Response time field.

FIG. 5 is a diagram for a format of Sync Frame according to a $1^{st}$ embodiment of the present invention.

The sync frame depicted in FIG. 4 is a data structure of the aforementioned sync information. As shown in the diagram, the sync frame includes an MHR, a Parameter Change, an Operating Mode, a Sync Period, an Image Sequence, an RO Count, a CAR Count, an LO Count, a CAL Count, a Timestamp, and an MFR field.

First of all, like the aforementioned goggle characteristic index frame, communication informations determined by Zigbee scheme are recorded in the MHR field and the MFR field.

And, the Parameter Change field records whether the sync information recorded in the sync frame is identical or different from the sync information recorded in a previously transmitted sync frame. This shall be described in FIG. 9.

A kind of image displayed in the 3 dimensional image display apparatus 100 is recorded in the Operating Mode field. This shall be described in FIG. 7.

Time information for transmitting next sync information is recorded in the Sync Period field. In particular, cycle time information for transmitting sync information is recorded in the Sync Period field. Hence, the 3 dimensional glasses 200 receives the sync information from the 3 dimensional image display apparatus 100 on the cycle time recorded in the Sync Period field and then performs the sync procedure [S500].

Information on 3 dimensional image output sequence is recorded in the Image Sequence field. In particular, the output sequence information of the left eye image and the right eye image is recorded in the field. This shall be described in FIG. 8.

Scan timing information of the left eye image and the right eye image is recorded in the RO Count, the CAR Count, the LO Count, the CAL Count field. This shall be described in FIG. 6.

Information on the time that the goggle characteristic index frame is transmitted to the 3 dimensional glasses 200 is recorded in the Timestamp field.

FIG. 6 is a diagram for formats of a Right Open Count, a Close After Right Count, a Left Open Count, a Close After Left Count field according to a 1$^{st}$ embodiment of the present invention.

Scan timing information of the left eye image and the right eye image is recorded in the RO (Right Open) Count, the CAR (Close After Right) Count, the LO (Left Open) Count, and the CAL (Close After Left) Count field.

First of all, as mentioned earlier, the left eye image and the right eye image should be alternately outputted to output a 3 dimensional image. In particular, a close section, which corresponds to a section not outputting both the left eye image and the right eye image, occurs between the outputs of the two images. Thus, the goggle control unit 250 of the 3 dimensional glasses 200 opens the left eye lens unit 220 in case that a left eye image is displayed in the 3 dimensional image display apparatus 100, opens the right eye lens unit 230 in case that a right eye image is displayed in the 3 dimensional image display apparatus 100, and should close both the left eye lens unit 220 and the right eye lens unit 230 in the close section.

Hence, the time of displaying the left eye image and the right eye image and the time information on the close section are recorded in the RO (Right Open) Count, the CAR (Close After Right) Count, the LO (Left Open) Count, and the CAL (Close After Left) Count field.

FIG. 6 depicts an example of each of the fields. Information on the time of displaying a right eye image in the 3 dimensional image display apparatus 100 is recorded in the RO Count field. Hence, the goggle control unit 250 opens the shutter of the right eye lens unit 230 according to an RO Count field value.

And, time information on the close section after a right eye image is displayed in the 3 dimensional image display apparatus 100 is recorded in the CAR Count field. Hence, the goggle control unit 250 closes the shutter of the left eye lens unit 220 and the right eye lens unit 230 according to a CAR Count field value.

And, Information on the time of displaying a left eye image in the 3 dimensional image display apparatus 100 is recorded in the LO Count field. Hence, the goggle control unit 250 opens the shutter of the left eye lens unit 220 according to an LO Count field value.

And, time information on the close section after a left eye image is displayed in the 3 dimensional image display apparatus 100 is recorded in the CAL Count field. Hence, the goggle control unit 250 closes the shutter of the left eye lens unit 220 and the right eye lens unit 230 according to a CAL Count field value.

And, a scan timing of the left image and the right image, i.e., a duty cycle information on the shutters of the left eye lens unit 220 and the right eye lens unit 230 can be derived using the aforementioned field values. As one example, the duty cycle of the shutter of the left eye lens unit 220 may correspond to a value resulted from LO Count/(RO Count+LO Count+CAR Count+CAL Count). The duty cycle of the shutter of the right eye lens unit 230 may correspond to a value resulted from RO Count/(RO Count+LO Count+CAR Count+CAL Count).

Hence, the goggle control unit 250 may be able to control to open/close of the shutter of the left eye lens unit 220 and the right eye lens unit 230 using the scan timing of the left image and the right image, i.e., the duty cycle information on the shutters of the left eye lens unit 220 and the right eye lens unit 230.

FIG. 7 is a diagram for a format of an operating mode field according to a 1$^{st}$ embodiment of the present invention.

A kind of image displayed in the 3 dimensional image display apparatus 100 is recorded in the Operating Mode field.

FIG. 7 depicts one example of the Operating Mode field. If '00b' value is recorded in the Operating Mode field, an image displayed in the 3 dimensional image display apparatus 100 corresponds to a 2 dimensional image, if '01b' value is recorded in the Operating Mode field, the image displayed in the 3 dimensional image display apparatus 100 corresponds to a 3 dimensional image, and if '10b' value is recorded in the Operating Mode field, the image displayed in the 3 dimensional image display apparatus 100 can be configured to mean that it corresponds to a dual view 3 dimensional image.

The 3 dimensional image display apparatus 100 may be able to display a 2 dimensional image as well as a 3 dimensional image. As mentioned in the foregoing description, if the 3 dimensional image is displayed in the 3 dimensional image display apparatus 100, the 3 dimensional glasses 200 opens the left eye lens unit 220 at the time of displaying a left eye image and should open the right eye lens unit 230 at the time of displaying a right eye image. And, if a 2D image is displayed in the 3 dimensional image display apparatus 100, the 3 dimensional glasses 200 should open the left eye lens unit 220 and the right eye lens unit 230 all the time.

And, the 3 dimensional image display apparatus 100 may be able to display a dual view 3 dimensional image. The dual view 3 dimensional image may indicate that two 3 dimensional images are displayed in the display unit 130, which is divided into two screens, respectively. In this case, the 3 dimensional glasses 200 should open the left eye lens unit 220 and the right eye lens unit 230 when the 3 dimensional image (the left image and the right image) of the 3 dimensional glasses is displayed.

Hence, the goggle control unit 250 may be able to control whether to operate the left eye lens unit 220 and the right eye lens unit 230 according to the Operating Mode field value.

FIG. 8 is a diagram for a format of an Image Sequence field according to a 1$^{st}$ embodiment of the present invention.

Information on an output sequence of a 3 dimensional image is recorded in the Image Sequence field. In particular, the information on the output sequence of a left eye image and a right eye image is recorded in this field.

FIG. 8 depicts one example of the Image Sequence field. If '000b' value is recorded in the Image Sequence field, the output sequence of a 3 dimensional image can be configured as 'C-L-C-R'. In this case, the 'C' corresponds to the Close and means that both the left eye image and the right eye image are not displayed. The 'L' corresponds to the Left and means that the left eye image is displayed. The 'R' corresponds to the Right and means that the right eye image is displayed.

Similarly, if '001b' value is recorded in the Image Sequence field, the output sequence of a 3 dimensional image can be configured as 'C-R-C-L', if '010b' value is recorded in the Image Sequence field, the output sequence of a 3 dimensional image can be configured as 'L-C-R-C', and if '011b' value is recorded in the image sequence field, the output sequence of a 3 dimensional image can be configured as 'R-C-L-C'.

Therefore, the goggle control unit 250 controls the sequence of opening/closing of the left eye lens unit 220 and the right eye lens unit 230 according to the Image Sequence field value.

In particular, the goggle control unit 250 closes both the left eye lens unit 220 and the right eye lens unit 230 in the 'C' sequence, opens the left eye lens unit 220 and closes the right eye lens unit 230 in the 'L' sequence, and closes the left eye lens unit 220 and opens the right eye lens unit 230 in the 'R' sequence.

FIG. 9 is a diagram for a format of a Parameter Change field according to a $1^{st}$ embodiment of the present invention.

The Parameter Change field records whether a sync information recorded in a sync frame is identical or different from the sync information recorded in a previously transmitted sync frame.

FIG. 9 depicts one example of the Parameter Change field. If '0b' value is recorded in the Parameter Change field, it means that the sync information recorded in the sync frame is identical to the sync information recorded in the previously transmitted sync frame. If '1b' value is recorded in the Parameter Change field, it means that the sync information recorded in the sync frame is not identical to the sync information recorded in the previously transmitted sync frame.

Thus, in case that the Parameter Change field corresponds to '0b' value, the goggle control unit 250 may be able to use the sync information previously read in the sync frame as it is. Yet, in case that the Parameter Change field corresponds to '1b' value, the goggle control unit 250 should control the 3 dimensional glasses 200 by reading the sync information of a currently transmitted sync frame.

FIG. 10 is a diagram for a format of a frame control according to a $1^{st}$ embodiment of the present invention.

The frame control depicted in FIG. 10 is one example of a data structure included in the aforementioned sync information. As shown in the diagram, the frame control includes a Destination Address field.

An address information of the 3 dimensional glasses 200 is recorded in the Destination Address field. In case that a plurality of 3 dimensional glasses are connected to the 3 dimensional image display apparatus 100, the 3 dimensional image display apparatus 100 should transmit a sync information to a corresponding 3 dimensional glasses 200. Hence, the address information of the 3 dimensional glasses 200 to which the 3 dimensional image display apparatus 100 intends to transmit should be recorded in the sync information.

The address information of the 3 dimensional glasses 200 recorded in the Destination Address field may include identification information of the corresponding 3 dimensional glasses 200 and a broadcast information broadcasting to transmit the sync information to all 3 dimensional glasses 200 connected to the 3 dimensional image display apparatus 100.

Hence, the goggle control unit 250 may be able to check whether the received sync information is the sync information of the goggle control unit using the Destination Address field value of the frame control.

FIG. 11 is a diagram for a format of a goggle state frame according to a $1^{st}$ embodiment of the present invention.

The goggle state frame depicted in FIG. 11 is a data structure of the aforementioned goggle state information. As shown in the diagram, the goggle state frame includes an MHR, a State Info. Index, an MFR field.

First of all, communication informations determined by Zigbee scheme are recorded in the MHR field and the MFR field.

And, a current state information of the 3 dimensional glasses 200 is recorded in the state info. Index field. The current state information of the 3 dimensional glasses 200 includes sync success, sync fail, goggle off, an identification request, battery level indication, charging level indication, and the like.

The identification request is explained as one example. In case that an event of pushing an identification button of the 3 dimensional glasses 200 by a user occurs, the goggle control unit 250 records a value corresponding to the identification request in the State Info. Index field and then transmits a goggle state frame in which the corresponding State Info. Index field is recorded to the 3 dimensional image display apparatus 100. And, the 3 dimensional image display apparatus 100 displays an identification of the 3 dimensional glasses 200, which transmitted the goggle state frame, in the display unit 130 via a GUI and the like.

And, the 3 dimensional glasses 200 periodically transmits the aforementioned goggle state frame to the 3 dimensional image display apparatus 100 and the 3 dimensional image display apparatus 100 may be able to display the state information of the 3 dimensional glasses 200 in the display unit 130 via the GUI and the like using the received goggle state frame.

Figure 12:
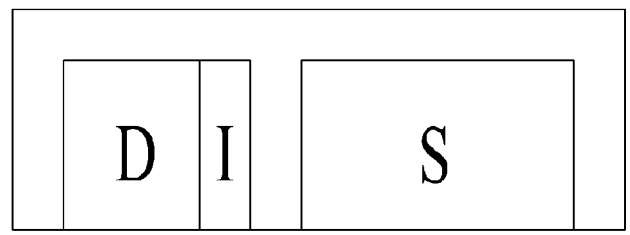
FIG. 12 is a diagram for a format of a sync frame according to a $2^{nd}$ embodiment of the present invention.

FIG. 12 is a diagram for a format of a sync frame according to a $2^{nd}$ embodiment of the present invention.

As shown in the diagram, the sync frame according to the $2^{nd}$ embodiment of the present invention includes a Dynamic Information (D), a Change Identifier (I), a Static Information (S).

The aforementioned Time Stamp field value, the scan timing information of a left eye image and a right eye image (RO Count field, CAR Count field, LO Count field, and CAL Count field) can be recorded in the Dynamic Information (D). In particular, frequently changing sync informations among the aforementioned sync informations are recorded in the Dynamic Information (D).

And, sync informations except the dynamic information (D) are recorded in the Static Information (S).

And, whether the sync information of the Static Information (S) is identical or different from the sync information of the Static Information (S) recorded in a previously transmitted is recorded in the change identifier (I).

As one example, a constant number value is recorded in the Change Identifier (I). If the sync information of the Static Information (S) is different from the sync information of the Static Information (S) recorded in the previously transmitted sync frame, a value increased by '1' from the number value of the previous Change Identifier (I) is recorded in the Change Identifier (I). On the contrary, if the sync information of the Static Information (S) is identical to the sync information of the Static Information (S) recorded in the previously transmitted sync frame, a value same with the number value of the previous Change Identifier (I) is recorded in the Change Identifier (I).

Thus, the goggle control unit 250 checks whether the value of the Change Identifier (I) is changed. In case that the value of the Change Identifier (I) is changed, the goggle control unit should control the 3 dimensional glasses 200 by reading the sync information of a currently transmitted sync frame. In case that the value of the Change Identifier (I) is not changed, the goggle control unit uses the sync information previously read in the sync frame as it is.

Figure 13:
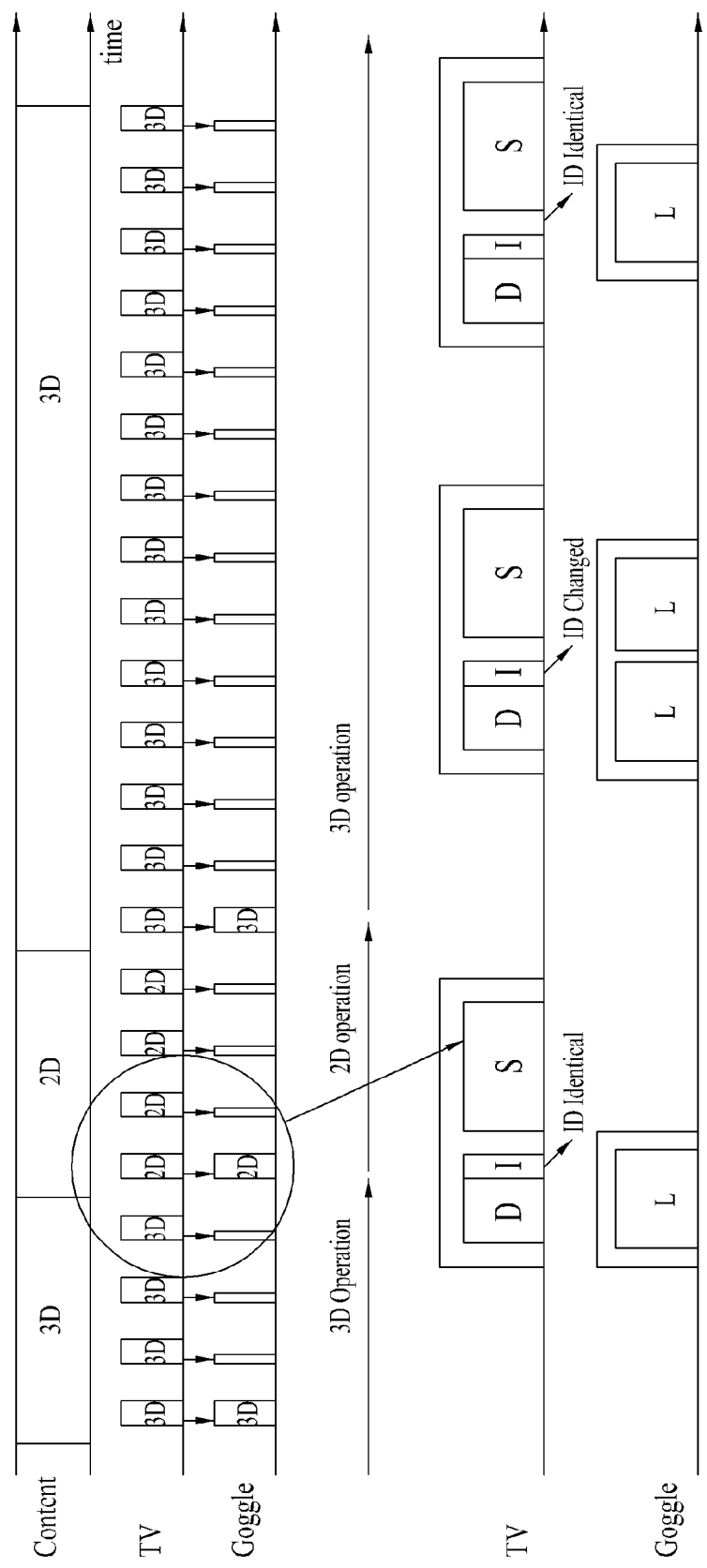
FIG. 13 is a diagram of a method of operating a 3 dimensional glasses and a 3 dimensional image display apparatus according to a $2^{nd}$ embodiment of the present invention.

FIG. 13 is a diagram of a method of operating a 3 dimensional glasses and a 3 dimensional image display apparatus according to a $2^{nd}$ embodiment of the present invention.

FIG. 13 depicts a case that an image displayed in the 3 dimensional image display apparatus 100 changes from a 3 dimensional image to a 2D image.

As shown in the diagram, the 3 dimensional image display apparatus 100 periodically transmits the sync frame aforementioned in FIG. 12 according to the $2^{nd}$ embodiment of the present invention to the 3 dimensional glasses 200.

A $1^{st}$ case of the diagram corresponds to the case that a 3 dimensional image is contiguously displayed in the 3 dimensional image display apparatus 100. A value same with the value of a previous change identifier (I) is recorded in the Change Identifier (I) of the sync frame according to the $2^{nd}$ embodiment of the present invention.

A $2^{nd}$ case of the diagram corresponds to the case that an image displayed in the 3 dimensional image display apparatus 100 changes from a 3 dimensional image to a 2D image. A value different from the value of a previous Change Identifier (I) is recorded in the Change Identifier (I) of the sync frame according to the $2^{nd}$ embodiment of the present invention. For instance, the value increased by '1' from the value of the Change Identifier (I) of the $1^{st}$ case is recorded.

A $3^{rd}$ case of the diagram corresponds to the case that a 2D image is contiguously displayed in the 3 dimensional image display apparatus 100. A value same with the value of a previous Change Identifier (I), i.e., the Change Identifier of the $2^{nd}$ case, is recorded in the Change Identifier (I) of the sync frame according to the $2^{nd}$ embodiment of the present invention.

Thus, the goggle control unit 250 of the 3 dimensional glasses 200 just reads the dynamic information (D) and the Change Identifier (I) in the sync frame in case of the $1^{st}$ and $3^{rd}$ case having the value of the Change Identifier (I) identical to the value of the previous change identifier (I).

Yet, in case of the $2^{nd}$ case, the goggle control unit 250 should read all of the Dynamic Information (D), the Change Identifier (I), and the Static Information (S) of the received sync frame.

Hence, in case that the sync information of the Static Information (S) is not changed, the goggle control unit 250 may not read the Static Information (S) with reference to the Change Identifier (I), thereby processing data more quickly. Moreover, since a listening period for reading the Static Information (S) is reduced, battery consumption can be reduced.

Figure 14:
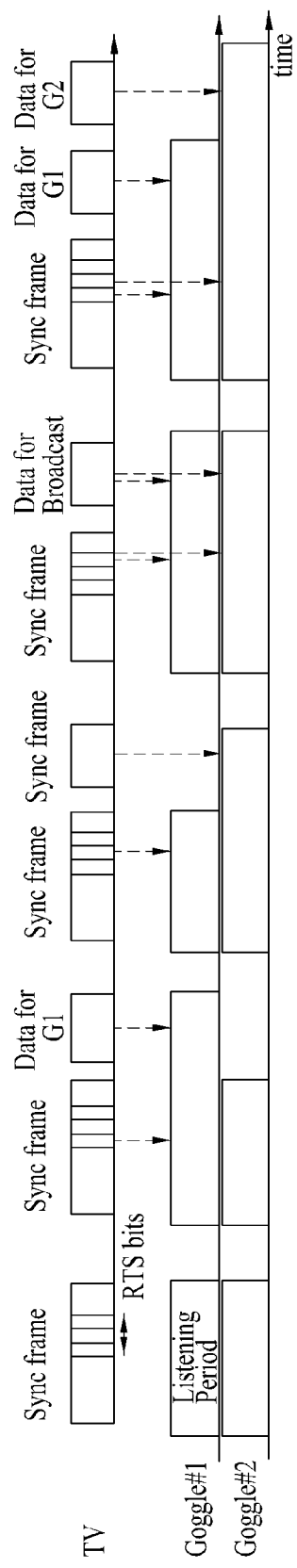
FIG. 14 is a diagram of a method of operating a 3 dimensional glasses and a 3 dimensional image display apparatus according to a $3^{rd}$ embodiment of the present invention.

FIG. 14 is a diagram of a method of operating a 3 dimensional glasses and a 3 dimensional image display apparatus according to a $3^{rd}$ embodiment of the present invention.

First of all, sync information of the $3^{rd}$ embodiment of the present invention includes goggle indication information. The goggle indication information corresponds to the information indicating that a data for goggle continuously transmitted after the sync information is aimed for the data of which 3 dimensional glasses 200.

As shown in the diagram, the goggle indication information can consist of RTS bit. In this case, the RTS bit values indicate each of the 3 dimensional glasses 200 connected to the 3 dimensional image display apparatus 100. In particular, the RTS bit can be configured to indicate all 3 dimensional glasses 200 connected to the 3 dimensional image display apparatus 100.

And, the goggle indication information can consist of address information of the 3 dimensional glasses 200 connected to the 3 dimensional image display apparatus 100.

The goggle control unit 250 of the 3 dimensional glasses 200 may be able to configure a listening period to read the data of the 3 dimensional glasses using the goggle indication information.

While the present invention has been described and illustrated herein with reference to the preferred embodiments and diagrams thereof, the present invention may be non-limited to the embodiments and it will be apparent to those skilled in the art that various modifications and variations can be made therein without departing from the spirit and scope of the invention. Thus, it is intended that the present invention covers the modifications and variations of this invention that come within the scope of the appended claims and their equivalents.

MODE FOR INVENTION

Various embodiments of the present invention are described in the best mode part.

INDUSTRIAL APPLICABILITY

The present invention relates to a 3 dimensional glasses, a 3 dimensional image display apparatus, and a method of operating the 3 dimensional glasses and the 3 dimensional image display apparatus. The present invention may be non-limited to the aforementioned embodiments. As shown in the attached scope of claim, various modifications and variations can be made by those having ordinary knowledge in the field, to which the present invention pertains and the modifications belong to the scope of the present invention.

What is claimed is:

1. A method for processing a 3-dimensional (3D) content at a broadcast receiver, the method comprising:
   decoding the 3D content including 3D images each of which includes a left image and a right image;
   generating the control signal for controlling a 3D glasses, wherein the control signal includes sync information including a left lens open reference field specifying a time reference for opening a left lens of the 3D glasses, and a left lens close reference field specifying a time reference for closing the left lens of the 3D glasses;
   transmitting the generated control signal to the 3D glasses; and
   displaying the decoded 3D content, wherein the displaying the decoded 3D content comprises displaying the left images and the right images alternately,
   wherein the control signal further includes a parameter change field specifying whether a change has been made to the control signal since last time the control signal was received.

2. The method of claim 1, wherein the control signal further includes an operating mode field indicating that the broadcast receiver provides more than two views for 3D contents simultaneously.

3. The method of claim 2, further comprising:
   receiving a request for identifying the 3D glasses from the 3D glasses; and
   displaying a result of a identification of the 3D glasses in response to the request.

4. The method of claim 2, further comprising:
   receiving goggle state information including an indication of a battery level of the 3D glasses from the 3D glasses; and
   displaying the battery level of the 3D glasses.

5. A broadcast receiver for processing a 3-dimensional (3D) content at a, the broadcast receiver comprising:
   an image processor configured to decode the 3D content including 3D images which include left images and right images;
   a control signal generator configured to generate the control signal for controlling a 3D glasses, wherein the control signal includes sync information including a left lens open reference field specifying a time reference for opening a left lens of the 3D glasses for, and a left lens close reference field specifying a time reference for closing the left lens of the 3D glasses;

a communication interface configured to transmit the generated control signal to the 3D glasses; and a display unit configured to display the decoded 3D content, wherein the displaying the decoded 3D content comprises displaying the left images and the right images alternately, wherein the control signal further includes a parameter change field specifying whether a change has been made to the control signal since last time the control signal was received.

6. The broadcast receiver of claim 5, wherein the control signal further includes an operating mode field indicating that the broadcast receiver provides more than two views for 3D contents simultaneously.

7. The broadcast receiver of claim 6, wherein the communication unit is further configured to receive a request for identifying the 3D glasses from the 3D glasses; and wherein the display unit is further configured to display a result of a identification of the 3D glasses in response to the request.

8. The communication interface of claim 6, wherein the communication unit is further configured to receive goggle state information including an indication of a battery level of the 3D glasses from the 3D glasses; and wherein the display unit is further configured to display the battery level of the 3D glasses.

\* \* \* \* \*